Patented Jan. 8, 1924.

1,480,533

UNITED STATES PATENT OFFICE.

WILLIAM R. CLYMER, OF CLEVELAND, OHIO, ASSIGNOR TO NATIONAL CARBON COMPANY, INC., A CORPORATION OF NEW YORK.

DEPOLARIZING MIXTURE AND METHOD OF PREPARING SAME.

No Drawing.    Application filed September 17, 1920.    Serial No. 410,923.

*To all whom it may concern:*

Be it known that I, WILLIAM R. CLYMER, a citizen of the United States, residing at Cleveland, in the county of Cuyahoga and State of Ohio, have invented certain new and useful Improvements in Depolarizing Mixtures and Methods of Preparing Same, of which the following is a specification.

This invention relates to a depolarizing mixture consisting essentially of manganese dioxid and carbon in a novel state of physical association and exhibiting a high degree of depolarizing efficiency in dry cells of the Le Clanché type. The invention relates also to methods of preparing such mixtures.

Depolarizing mixtures for Le Clanché cells are now commonly prepared by commingling manganese dioxid, natural or artificial, with either graphite or non-graphitic carbon, the components being preliminarily ground and graded to a degree of fineness suitable for the purpose in view, and the mixture being usually mixed with sal ammoniac and moistened with electrolyte solution, and either tamped into the cans around a carbon electrode or molded into so-called bobbins.

According to the present invention the carbon and manganese dioxid components of such depolarizing mixtures are subjected to a joint milling or equivalent operation, the preferred milling conditions being as herein below described. Sal ammoniac is added to the resulting milled mixture which is then preferably moistened with water or with electrolyte solution, and either tamped into the battery or molded into bobbin form according to the type of battery desired.

I have discovered that for dry battery purposes the joint milling of carbon and manganese dioxid yields a product materially higher in deplorazing value than any product which I have been able to obtain by singly grinding or milling the components for an equal period of time, or to the same general order of fineness, and thereafter thoroughly commingling the ground materials. I attribute this effect in part to the interaction during the milling operation of two substances differing rather widely in hardness and in other qualities affecting the grinding operation, and in part to the physical state of association of the components of the milled mixture.

My preferred mixture consists of native manganese dioxid ore or pyrolusite, the quality commonly known as Phillipsburg pyrolusite having been found well adapted for the purpose; and carbon derived from petroleum coke, previously calcined electrically at about 1600–1800° C., whereby all volatile matters are expelled and the carbon acquires, with minimum current input, the desirable degree of electrical conductivity for the particular purpose in view. My invention is not limited however to the choice of materials of these particular grades or qualities.

A preferred procedure in accordance with my invention is as follows, it being understood that the invention is not restricted to the specific manipulations or to the particular quality or proportion of components described by way of example:

Petroleum coke, calcined as above described and crushed in a Jeffrey or other pulverizer to pass a one-fourth inch opening is mixed with pyrolusite, previously crushed to pass a 30 mesh screen, as for example by Sturtevant rolls. The resulting mixture is then milled for several hours in a pebble mill or equivalent device for mechanical reduction. Either dry or wet milling may be employed, the formed being preferred. Satisfactory results have been obtained for instance by 4–7 hours milling in an Abbe #7 pebble mill, at about 36 revolutions per minute. Under these conditions, the carbon, being the softer component, or at any rate undergoing the more rapid reduction in size, appears to coat the pyrolusite particles, with the result that there is established between the carbon and pyrolusite components an extreme intimacy of contact as well as a highly favorable surface-exposure relation. Also, the resulting mix possesses a relatively high absorptive capacity for electrolyte solution.

Batteries prepared from these mixtures have shown service results materially better than are obtainable from the same materials separately ground and intimately mixed; and also service results equal to or better than those obtainable with graphite or other expensive forms of carbon of extreme fineness.

When the raw materials are pyrolusite and highly calcined petroleum coke, and the dry batteries are of the so-called midget type, a mix ratio approximately 2 parts of pyrolusite to 1 part of coke represents the optimum with respect to initial amperage and service. Materially higher ratios of pyrolusite, for example 3:1 afford excellent service but the initial amperage is undesirably low; while materially lower pyrolusite ratios, for example 1.4:1, give excellent initial amperages, but the service. although good, is inferior to that obtainable with the higher pyrolusite content. For batteries of the six-inch type, a pyrolusite carbon ratio of the order of 1.4:1 is satisfactory. However my invention is not limited to the employment of the manganese dioxid and carbon in any particular proportions, especially since these prportions may vary considerably according to the nature of grade of the manganese dioxid and carbon components used, and with the size and service requirements of the cells in which the mix is used.

The desirable state of division of the components of the mixture to be milled will naturally vary with the quality or character of these components, and also in a measure with the milling facilities available. As a general rule however the best results are secured when the carbon is initially in a coarser state of subdivision than the pyrolusite. In the milled product, on the other hand, a considerable proportion at least of the carbon component exists in a very fine state of subdivision, the rate of subdivision being greatly accelerated by the presence of the harder particles of pyrolusite.

While I have referred above to highly calcined petroleum coke and native manganese dioxid as the commercially desirable raw materials for use in connection with the present invention, it is to be understood that other forms of carbon and manganese dioxid may be employed without departure from my invention. Thus for example the pyrolusite may be replaced wholly or in part by artificial manganese dioxid; and similarly the highly calcined petroleum coke may be replaced wholly or in part by other fully shrunk and suitably conductive forms of carbon, or by graphite.

I claim:—

1. Method of preparing a battery depolarizer comprising subjecting a mixture containing pyrolusite and conductive carbon to a milling operation until the desired depolarizing efficiency is attained.

2. Method of preparing a battery depolarizer comprising subjecting a mixture containing pyrolusite and conductive carbon to a milling operation until the desired depolarizing efficiency is attained, the carbon particles being initially coarser than the manganese dioxid particles.

3. Method of preparing a battery depolarizer comprising subjecting a mixture containing pyrolusite and highly calcined petroleum coke to a milling operation until the desired depolarizing efficiency is attained.

4. Method of preparing a battery depolarizer comprising subjecting a mixture containing pyrolusite and highly calcined petroleum coke to a milling operation until the desired depolarizing efficiency is attained, the petroleum coke particles being initially coarser than the pyrolusite particles.

5. A depolarizing mixture for electric batteries comprising the product of the joint milling of pyrolusite and conductive carbon, said mixture comprising particles of the respective components in the intimate physical association resulting from said milling operation.

6. A depolarizing mixture for electric batteries comprising the product of the joint milling of pyrolusite and highly calcined petroleum coke, said mixture comprising particles of the respective components in the intimate physical association resulting from said milling operation.

7. A depolarizing mixture for electric batteries comprising particles of pyrolusite superficially coated with highly conductive carbon.

In testimony whereof, I affix my signature.

WILLIAM R. CLYMER.